Patented Nov. 7, 1933 1,934,038

UNITED STATES PATENT OFFICE 1,934,038

PROCESS OF VULCANIZING RUBBER TO LEATHER

Leon B. Conant, Wellesley, Mass.

No Drawing. Application December 20, 1932
Serial No. 648,141

9 Claims. (Cl. 18—59)

This invention relates to an improvement in the heat treatment of leather, having application, particularly, during the period immediately preceding its introduction together with the rubber composition to the heat and pressure of vulcanization. The primary purpose of this invention is to establish an effective guarantee that the dehydrated, heated leather, despite the pre-vulcanization period of its handling between the dryer and the press, shall possess complete adaptation for combination with rubber composition during hot vulcanization with pressure.

Many and various proposals have been made heretofore dealing with the vulcanization of rubber to leather and among them an unusual proposition recently advanced describes the vulcanization of rubber composition at high temperature with pressure to cement coated leather which is introduced to the vulcanization neither heated or dried of necessity, but, instead, simply separated from the press platen adjacent thereto by a pad of porous fabric designed to absorb the vaporized moisture emitted from both the rubber and leather during the vulcanization. I have demonstrated repeatedly that this proposition is not workable except in connection with the employment of the coarsest and cheapest of leathers, namely, rough flesh-splits whose natural porosity offers no impediment to the free movement of the vapors initiated by hot vulcanization.

In the specifications comprising U. S. patents numbered 1,719,101, 1,769,943 and 1,787,145, issued respectively July 2, 1929, July 8, 1930 and December 30, 1930, I have described the principles underlying the vulcanization of rubber to leather with heat and pressure. The first patent, aforesaid, disclosed the heat treatment of leather at vulcanizing temperature (a mean of 220° F.) in preparation for combination with rubber composition during ordinary hot vulcanization with pressure; the second described an improved understanding of the effect of heat upon leather by providing for a graduated application thereof prior to the vulcanization; the third disclosed the need of a cement coat upon the leather to engage the rubber composition and adapted to co-ordinate its cure therewith.

In each of the foregoing patent specifications I have emphasized the necessity of segregating the heat treatment of leather from the application of pressure thereto during its preparation for combination with rubber composition by means of ordinary hot vulcanization. Also, I have previously described the exact manner of pre-heating the leather in the dryer whereby its body-heat becomes elevated and its hydro-static moisture content eliminated as it is brought gradually to the temperature equivalent of the heat of hot vulcanization in completion of its adaptation for the vulcanization, and, avoiding thereby, during the maintenance thereof, any risk of injury from the rubber vapors promoted during hot vulcanization. To summarize, the process described in the aforesaid patents may be said to comprise the hot vulcanization of rubber composition with pressure to cement coated leather heated to adaptation therefor.

In putting the aforesaid process to work in regular production, I have found that the difference between theory and practice is an uncertain equation controlled largely by the schedule of the operation and the measure of care given by the operatives, plus the efficiency of the equipment. As an example, ordinary press practice provides that the pressmen rotate the moulds whereby one is loaded as the others work with the press cure. This program of rotation further provides that each cure shall end several minutes ahead of the next. As each cure arrives at its termination, the mould is withdrawn from the press and the loaded mould awaiting its turn is introduced therein. The mould just withdrawn is now emptied and re-loaded, and so on. Usually, a matter of several minutes is required to open and close the press and change the moulds. Obviously, any careless handling of the pre-heated leather between the dryer and the press during the loading of the moulds results in a marked let-down of its body-temperature that may seriously impair its adaptation for hot vulcanization with pressure. In order to govern this situation, I now propose to provide simple but positive means whereby the pressmen entrusted with the operation of the process become assured of an improved opportunity to perform their work with maximum efficiency.

This improvement relates particularly to the manner of processing and protecting the leather in the mould during the period preceding its introduction between the hot platens of the vulcanizing press, whereby, having placed the rubber composition and the heated leather in the mould, I now introduce a pad composed of felted or woven fibres heated to a high temperature, equal substantially to the heat of vulcanization, and cover the leather therewith, in effect, as with a heat-energized blanket, and, having placed the heated metal top-plate of the mould thereupon the heat radiation therefrom promotes the heat-energy of the hot pad or blanket covering the leather. At the same time, the heat radiation from the hot metal mould-plate containing the rubber composition initiates the vaporization of the hydrostatic moisture content thereof while the hot mould top-plate increases the efficiency of the heated pad or blanket to absorb the vaporized moisture from the leather. It being understood that during the interval preceding the application of heat and pressure by the vulcanizing press to the loaded mould, usually a matter of minutes, the highly heated pad becomes and acts as a hot poultice drawing the residual moisture from the leather and rubber. In this manner, the presence in the mould of the heated pad or hot poultice restores to the leather, prior to vulcanization, that prime condition of adaptation which its original pre-heating provided but subsequent handling between the dryer and the press impaired. It is desirable that a hot pad be assigned to each mould, preferably being attached to the top-plate thereof in any suitable manner. During the vulcanization the functions of the hot pad or poultice, as such, cease; the application of heat and pressure thereto affording the opportunity simply for the pad to become thoroughly heat-energized whereby it may again become a heat poultice at the completion of the reloading of the mould with another lot of rubber and leather in the regular routine of its successive operation. If it is desired to use the hot pad or blanket independent of moulds as in the case of the production of combination belting and other products requiring comparatively large dimensions of leather, it is advisable, simply, that the pad then be passed through the entire preheating operation with the leather thereby blanketing the heat therein as the body-heat thereof becomes elevated to adaptation for hot vulcanization with pressure, whereupon, the whole is introduced between the heated platens of the vulcanizing press and processed in the usual manner.

I claim:

1. The process consisting in hot vulcanizing rubber composition with pressure to cement coated leather finally heated to adaptation therefor by means of a hot fibrous blanket applied thereto and in engagement therewith before and during the vulcanization.

2. The process consisting in hot vulcanizing rubber composition with pressure to cement coated leather finally heated to adaptation therefor by the application of a heated fibrous blanket protecting the leather before and during vulcanization.

3. The process consisting in vulcanizing rubber composition with heat and pressure to cement coated leather finally heated to adaptation therefor by the application of a highly heated fibrous pad covering the leather before and during vulcanization.

4. The process consisting in vulcanizing rubber composition with heat and pressure to cement coated leather heated to adaptation therefor, finally, by the application of a heat-energized pad thereto before and during vulcanization.

5. The process comprising the assembly of a pad with leather, both heated to adaptation for the heat of hot vulcanization, and, while so heated, uniting and vulcanizing rubber composition to the leather with heat and pressure.

6. The process consisting in hot vulcanizing rubber composition to leather heated to adaptation therefor by means of a fibrous covering heated to an elevated temperature and applied thereto before and during hot vulcanization.

7. The process consisting in hot vulcanizing rubber composition to leather prepared therefor by means of a fibrous blanketing heated to a hot vulcanizing temperature and applied thereto before and during hot vulcanization with pressure.

8. The process comprising the combination of a fibrous pad and leather heated to a uniform temperature in a mould in adaptation for hot vulcanization of rubber composition to the heated leather and, while so heated, vulcanizing rubber composition thereto with heat and pressure.

9. The process comprising the assembly of a pad with leather in a highly heated mould containing rubber composition, applying a highly heated cover to said mould and pre-heating the assembly to adaptation for hot vulcanization of the rubber composition to the heated leather, and, while so pre-heated, introducing the whole to hot vulcanization with pressure and effecting said vulcanization.

LEON B. CONANT.